Patented June 17, 1947

2,422,616

UNITED STATES PATENT OFFICE 2,422,616

VITAMIN B₆ INTERMEDIATES AND PROCESS OF PREPARING THE SAME

Stanton A. Harris, Westfield, N. J., assignor to Merck & Co., Inc., Rahway, N. J., a corporation of New Jersey No Drawing. Application July 22, 1943, Serial No. 495,772

12 Claims. (Cl. 260—297)

This invention relates generally to chemical compounds useful in the synthesis of vitamin B₆ and methods of preparing the same, and in a more particular sense is concerned with compounds represented by the formula

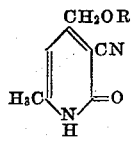

wherein R is an aryl, arylalkyl, or alkyl group, together with methods of preparing said compounds.

This case is a continuation-in-part of copending applications by the same inventor bearing Serial Numbers 267,603 (filed April 13, 1939) and 400,987 (filed July 3, 1941, a division of application filed Dec. 27, 1938, Serial Number 247,948, now Patent 2,248,078).

Regarded in certain of its broader aspects, the novel processes for obtaining compounds represented by the formula:

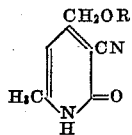

wherein R is an alkyl, an arylalkyl, or an aryl group, can be indicated as follows:

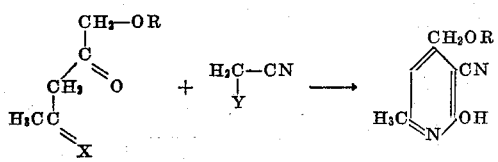

wherein X is =O or =NH and Y is —CN, —COOR or —CONH₂.

The above reaction product can exist in the indicated enol-form or in its keto-form equilibrant:

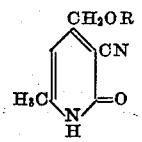

It is remarkable that the above condensation reaction proceeds to form the indicated product in large yield without formation of the alternative condensate:

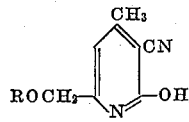

The reaction can occur in aqueous or alcoholic solvents and is preferably performed in the presence of ammonia or a secondary amine. The ammonia, if desired, can be reacted with the diketone or cyanoacetic ester prior to or concurrently with the condensation reaction. The condensation reaction is favorably catalyzed by secondary amines such as saturated aliphatic amines (dimethylamine, diethylamine, and their homologs), unsaturated aliphatic amines (diallylamine, dicrotylamine, and their homologs), aliphatic-aromatic amines (methylbenzylamine and its homologs), and N-heterocyclic compounds having secondary amine characteristics, particularly piperidine. Inasmuch as the secondary amine serves merely as a catalyst in the condensation reaction, it will be obvious that the relative quantity present in the reaction mixture above the minimum required for optimum speed of reaction, is not critical.

The following examples illustrate methods of carrying out the present invention, but it is to be understood that these examples are given by way of illustration and not of limitation.

*Example 1*

Approximately 1.2 mols (about 100 g.) of cyanoacetamide ($H_2N.CO.CH_2.CN$) are dissolved in about 750 cc. of hot ethanol (95%) and approximately 1 mol (about 130 g.) of methoxyacetylacetone ($H_3C.CO.CH_2.CO.CH_2OCH_3$) and 10 cc. of piperidine are added with agitation of the mixture. The ensuing reaction is somewhat exothermic, accordingly the mixture is cooled. After standing, cooling, filtering and washing the crystals thus obtained with ethanol, the product, 3-cyano-4-methoxymethyl-6-methyl-pyridone-2, is obtained and, if desired can be further purified by crystallization from alcohol. M. P. about 240° C. corr. If desired, an equivalent quantity of a different secondary amine can be substituted for the piperidine, for example, one of the amines mentioned above in the general description of this invention.

*Example 2*

To about 65.3 g. of cyanoacetamide ($H_2N.CO.CH_2.CN$)

dissolved in approximately 500 cc. of hot ethanol (95%), about 93.1 g. of ethoxyacetyl-acetone (H₃C.CO.CH₂.CO.CH₂OC₂H₅) and approximately 8.5 cc. of piperidine are added with shaking and cooling. After standing and cooling, the crystals formed are removed by filtration and washed with alcohol. After recrystallization from alcohol, the product, 3-cyano-4-ethoxymethyl-6-methyl-pyridone-2 is obtained as white crystals, M. P. about 210° C. corr. As in Example 1, other secondary amines can be substituted for piperidine as a catalyst for the reaction.

*Example 3*

About 50 g. (.6 mol.) of cyanoacetamide (H₂N.CO.CH₂.CN) are dissolved in approximately 350 cc. of hot ethanol (95%) and about 79 g. (.5 mol.) of propoxyacetylacetone (H₃C.CO.CH₂.CO.CH₂OC₃H₇)

and about 5 cc. of piperidine are added, the mixture being cooled and agitated during the addition. After standing, cooling, filtering, and washing as in the foregoing examples, the product is obtained, 3-cyano-4-propoxymethyl-6-methyl-pyridone-2.

*Example 4*

About 100 g. of cyanoacetamide (H₂N.CO.CH₂.CN)

are dissolved in approximately 750 cc. of hot ethanol (95%) and about 192 g. of phenoxyacetyl-acetone (H₃C.CO.CH₂.CO.CH₂OC₆H₅) and 10 cc. of piperidine are added with agitation to the mixture which is thereafter further processed as in Example 1. The product obtained is 3-cyano-4-phenoxymethyl-6-methyl-pyridone-2.

*Example 5*

About 84 gms. of cyanoacetamide are dissolved in approximately 740 cc. of hot ethyl alcohol and to this solution 130 gms. of methoxyacetylacetone are added. When the temperature of the solution has dropped to 60° C., 12 cc. of piperidine are added slowly with stirring. The color of the solution turns dark red and the temperature rapidly rises to 70° C. Crystals soon appear and the temperature rises to 78° C. The alcohol boils for about one half hour and the mixture becomes a thick mass of crystals. The mixture is allowed to stand over night at room temperature. After filtering and washing with ethanol and ether, the precipitate of 3-cyano-4-methoxymethyl-6-methylpyridone-2 is separated and recrystallized from glacial acetic acid (M. P., 242-243° C.).

*Example 6*

About 1.13 gms. of ethyl cyanoacetate are dissolved in approximately 5 cc. of cold concentrated ammonia water and about 1.44 gms. of 1-methoxy-2,4-hexadiene are added. After a few minutes, 3-cyano-4-methoxymethyl-6-ethyl-pyridone-2 separates as a white crystalline solid, M. P. 187° C. The mixture is diluted with water, filtered and the residue washed with water, alcohol and ether.

In like manner, other alkoxyacetylacetones, aryloxyacetylacetone, and arylalkoxyacetylacetones can be condensed with cyanoacetamide to produce the corresponding 4-alkoxymethyl, 4-aryloxymethyl, or 4-arylalkoxyacetylacetones.

Modifications may be made in carrying out the present invention without departing from the spirit and scope thereof and the invention is to be limited only by the appended claims.

What is claimed is:
1. Compounds represented by the formula:

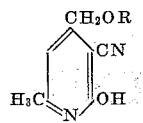

wherein R is an alkyl group.

2. Compounds represented by the formula:

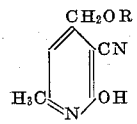

wherein R is an aryl group.

3. The compound represented by the formula:

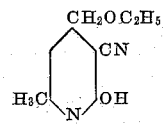

4. The compound represented by the formula:

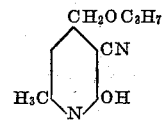

5. The compound represented by the formula:

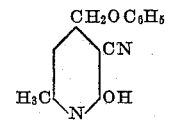

6. The process that comprises reacting a 1-alkoxy-2:4-diketo-pentane with cyanoacetamide as represented by the following reaction:

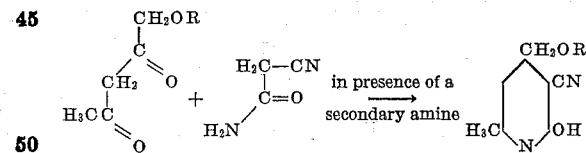

wherein R is an alkyl group.

7. The process that comprises reacting a 1-aryloxy-2:4-diketo-pentane with cyanoacetamide as represented by the following reaction:

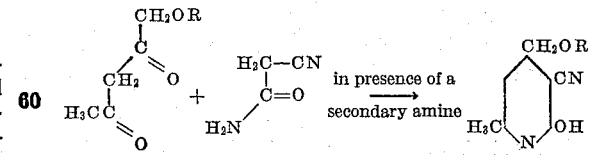

wherein R is an aryl group.

8. The process that comprises reacting 1-ethoxy-2:4-diketo-pentane with cyanoacetamide as represented by the following reaction:

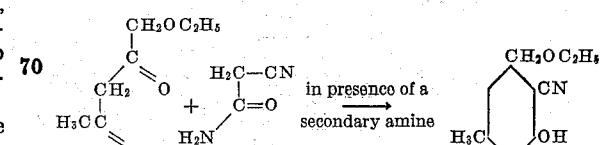

9. The process that comprises reacting 1-butyloxy-2:4-diketo-pentane with cyanoacetamide as represented by the following reaction:

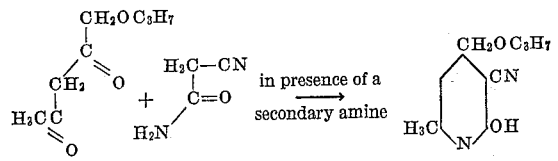

10. The process that comprises reacting 1-phenoxy-2:4-diketo-pentane with cyanoacetamide as represented by the following reaction:

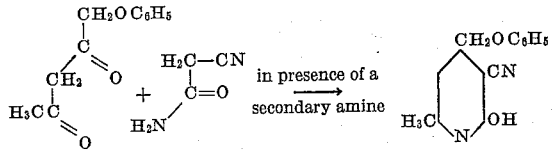

11. Compounds represented by the formula:

$$\text{H}_3\text{C}\underset{\text{N}}{\bigcirc}\overset{\text{CH}_2\text{OR}}{\underset{\text{OH}}{\text{CN}}}$$

wherein R is a radical selected from the class consisting of alkyl and aryl groups.

12. The process that comprises reacting cyanoacetamide with a substance selected from the class consisting of 1-alkoxy-2:4-diketo-pentanes and 1-aryloxy-2:4-diketo-pentanes as represented by the following reaction:

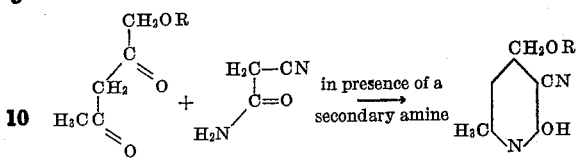

wherein R is a radical selected from the class consisting of alkyl and aryl groups.

STANTON A. HARRIS.

REFERENCES CITED

The following references are of record in the file of this patent:

UNITED STATES PATENTS

| Number | Name | Date |
| --- | --- | --- |
| 2,248,078 | Harris | July 8, 1941 |

OTHER REFERENCES

Enzymologia, VII, 28 XII, 1939, pp. 385—6,